United States Patent
Kulkarni et al.

(10) Patent No.: US 9,769,263 B2
(45) Date of Patent: Sep. 19, 2017

(54) PREDICTIVE CONNECTION REQUEST SHEDDING

(71) Applicant: EBAY INC., San Jose, CA (US)

(72) Inventors: Sarang Mukund Kulkarni, Folsom, CA (US); Christopher John Kasten, Rancho Cordova, CA (US); Guomin Jin, Roseville, CA (US); Kyle Smith, Mountain Ranch, CA (US)

(73) Assignee: EBAY INC., San Jose, CA (US)

(*) Notice: Subject to any disclaimer, the term of this patent is extended or adjusted under 35 U.S.C. 154(b) by 289 days.

(21) Appl. No.: 14/586,020

(22) Filed: Dec. 30, 2014

(65) Prior Publication Data

US 2016/0164980 A1  Jun. 9, 2016

Related U.S. Application Data

(60) Provisional application No. 62/088,326, filed on Dec. 5, 2014.

(51) Int. Cl.
| | |
|---|---|
| *H04L 29/08* | (2006.01) |
| *G06F 17/30* | (2006.01) |
| *G06F 9/44* | (2006.01) |
| *G06F 9/50* | (2006.01) |
| *G06F 9/54* | (2006.01) |

(52) U.S. Cl.
CPC ............... *H04L 67/14* (2013.01); *G06F 9/44* (2013.01); *G06F 9/5022* (2013.01); *G06F 9/546* (2013.01)

(58) Field of Classification Search
USPC .................. 707/713, 718, 716; 370/229
See application file for complete search history.

(56) References Cited

U.S. PATENT DOCUMENTS

| | | | | |
|---|---|---|---|---|
| 6,834,305 | B1 * | 12/2004 | Haynes | H04L 67/14 709/200 |
| 9,516,168 | B2 * | 12/2016 | Camulli | H04M 3/5238 |
| 2005/0081210 | A1 * | 4/2005 | Day | G06F 9/5016 718/104 |
| 2007/0041565 | A1 * | 2/2007 | Williams | H04M 3/5231 379/265.02 |
| 2012/0054514 | A1 * | 3/2012 | Barsness | G06F 1/329 713/320 |

* cited by examiner

*Primary Examiner* — Hung T Vy
(74) *Attorney, Agent, or Firm* — Maschoff Brennan

(57) ABSTRACT

According to one or more embodiments, a method may include obtaining a connection request to communicate with a database. The method may further include determining a predicted wait time for the connection request. The predicted wait time may include a predicted amount of time until a connection with the database will be available to communicate with the database. The method may further include determining whether to shed the connection request before a connection request timeout time. The determination as to whether to shed the connection request may be based on whether the predicted wait time exceeds the connection request timeout time.

20 Claims, 3 Drawing Sheets

PREDICTIVE CONNECTION REQUEST SHEDDING

FIELD

The embodiments discussed herein are generally related to predictive connection request shedding.

BACKGROUND

Queries may be sent to a database of a database management system in response to application requests to access the database. In some embodiments, connection requests for connections with the database for processing the queries may be placed in a connection wait queue ("wait queue") of the database management system. In some instances, the length of the wait queue may be such that one or more connection requests may time out before a connection is available for the corresponding query to communicate with the database. An increase in connection requests in the wait queue may have a negative effect on components in the database management system that may be upstream from the wait queue, which may also cause a negative end-user experience from the perspective of a client device from which the application requests may be derived.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
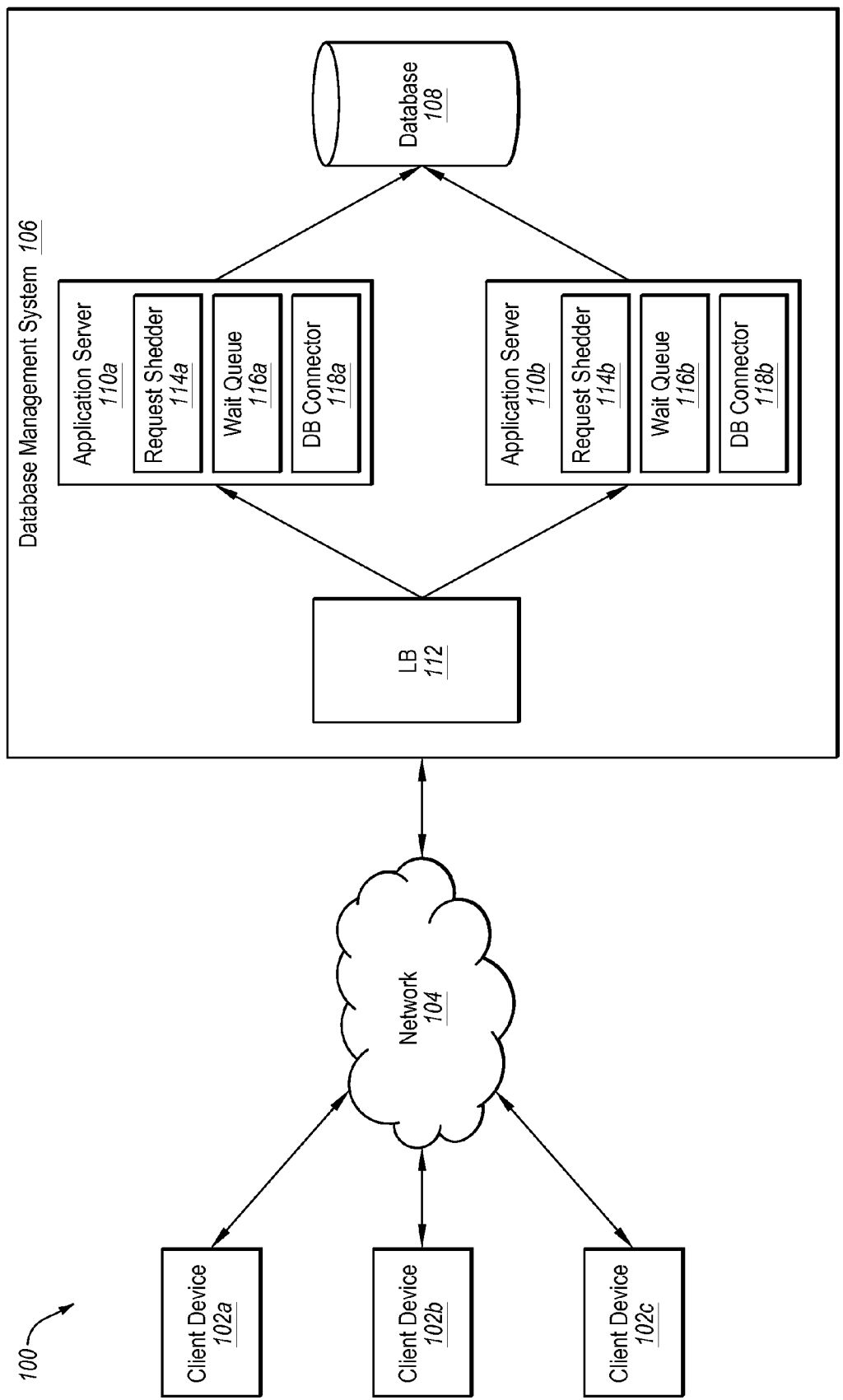
FIG. 1 is a diagram representing an exemplary system configured to perform predictive connection request shedding.

As detailed below, an application server of a database management system may receive an application request to access a database. The application request may be derived from a client device and may correspond to a particular function associated with a particular application that may be executed at the client device. The application request may include a request to read from the database, write to the database, delete data stored on the database, any other applicable operation that may be performed with respect to data stored on the database, or any combination thereof, In response to the received application request, the application server may generate a connection request for the database. The connection request may correspond to a query that may include a request to access the database and to perform the operation included in the application request with respect to the database. The connection request may include a request to utilize a connection between the database and the application server to perform the operations associated with the query. In response to the connection request being granted, the application server may communicate with the database based on the corresponding query via the connection. In the present disclosure, use of the term "query" may refer to any operation that may be performed with respect to data stored on the database. For example, a query may include a read operation, a write operation, a delete operation, an update operation, or any other applicable operation.

In some embodiments, the database management system may include a connection pool that may be associated with a particular application. The connection pool may include one or more connections between the database and one or more application servers that may be designated for use with respect to queries associated with the particular application. In some instances, every connection in the connection pool may be in use at a particular point in time. As such, in some embodiments, the application server may be configured to place, in a connection wait queue ("wait queue"), connection requests that may be designated for the connection pool in response to all the connections in the connection pool being in use.

In the present disclosure, the connection pool may be referred to as being depleted when every connection currently in the connection pool is being utilized. Additionally, in some embodiments, the connection pool may have a maximum number of connections that may be included therein. In the present disclosure, the connection pool may be referred to as being maximized when the connection pool includes the maximum number of connections. At different times the connection pool may be depleted but not maximized, maximized but not depleted, maximized and depleted, or neither depleted nor maximized.

For example, a particular connection pool that includes five connections where all five connections are in use and that also has ten maximum possible connections may be referred to as being depleted but not maximized. As another example, a particular connection pool that includes ten connections where nine of the ten connections are in use and that has ten maximum possible connections, may be referred to as being maximized but not depleted. As another example, a particular connection pool that includes ten connections where ten of the ten connections are in use and that has ten maximum possible connections, may be referred to as being maximized and depleted. Additionally, as another example, a particular connection pool that includes five connections where three of the five connections are in use and that has ten maximum possible connections, may be referred to as not being maximized and not being depleted.

Some embodiments described herein relate to methods and systems of performing predictive connection request shedding. The predictive connection request shedding may be performed to determine whether or not a connection request may time out and be dropped from the connection wait queue before a connection, between the database and the application server, for processing a corresponding query is available in a corresponding connection pool. A connection request may "time out" when a particular amount of time (also referred to as a "timeout time") has passed in which the connection request has been waiting for a connection.

When it is determined that the connection request may time out before a connection is available, the connection request may be proactively shed before actually timing out. Reference to shedding of a connection request may refer to the connection request being deleted or removed before being granted or before timing out. As described below, in some embodiments, the connection request may be shed before being entered in the wait queue or may be shed after being entered into the wait queue. The shedding may help reduce the number of connection requests that may be in the wait queue that may correspond to the associated connection pool. The shedding may help reduce negative effects on other components of the database management system, which may allow the database management system to more effectively process application requests and improve an end-user experience.

Exemplary embodiments of the predictive connection request shedding are explained with reference to the accompanying drawings.

FIG. 1 is a diagram representing an exemplary system 100 configured to perform predictive connection request shedding, arranged in accordance with at least one embodiment described herein. The system 100 may include one or more client devices 102, a network 104, and a database management system 106.

As indicated above, the system 100 may include any number of client devices 102. In the illustrated example, the system 100 is depicted as including a client device 102a, a client device 102b and a client device 102c. However, the number of client devices 102 illustrated in FIG. 1 is for exemplary purposes and is not meant to be limiting.

The client devices 102 may include any suitable system, apparatus, or device that may be configured to generate an application request to access a database 108 of the database management system 106. The application requests may correspond to functions associated with applications that may be executed at the client devices 102. The client devices 102 may include a cellular phone, a smartphone, a personal data assistant (PDA), a laptop computer, a personal computer, a tablet computer, a gaming system, a smart television, a video disc player (e.g., a Blu-ray player) or any other similar device. In some embodiments, the client devices 102 may be configured to communicate their respective application requests for the database 108 via the network 104.

The network 104 may include any interconnecting system capable of transmitting audio, video, signals, data, messages, or any combination of the preceding. For example, the network 104 may include all or a portion of a public switched telephone network (PSTN); a public or private data network; a local area network (LAN); a metropolitan area network (MAN); a wide area network (WAN); a cellular network; a local, regional, or global communication or computer network such as the Internet; a wireline or wireless network; an enterprise intranet; another suitable communication link; or any combination of the preceding.

The database management system 106 may include a load balancer (LB) 112, one or more application servers 110, and the database 108. In the illustrated example, the database management system 106 is illustrated as including an application server 110a and an application server 110b. However, the database management system 106 may include any number of application servers 110.

The load balancer 112 may be configured to receive application requests from the client devices 102 and to distribute the application requests among the application servers 110. The load balancer 112 may include any suitable software, hardware, firmware, or any combination thereof, configured to perform load balancing operations.

The application servers 110 may be configured to receive application requests distributed by the load balancer 112 and may be configured to generate connection requests and corresponding queries for the database 108 based on the application requests. The application servers 110 may be communicatively coupled to the database 108 via one or more connections. Additionally, the connections between the application servers 110 and the database 108 may be divided into any number of connection pools according to how the database management system 106 is set up with respect to handling application requests for different applications.

The foregoing description is given with respect to one connection pool and application requests, connection requests, and queries that correspond to the applications associated with the connection pool to simplify the description. However, it is understood that the database management system 106 may include any number of connection pools and the principles and operations described may equally apply to those connection pools and their corresponding application requests, connection requests, and queries.

In some embodiments, the application servers 110 may each include a connection wait queue 116 ("wait queue 116"), a request shedder 114, and a database connector ("DB connector") 118. In some embodiments, the application servers 110 may include a wait queue 116 for each connection pool associated with the database 108. Additionally, in some embodiments, the application servers 110 may include a request shedder 114 for each connection pool, a request shedder 114 for more than one connection pool, or a request shedder 114 for all the connection pools, depending on the particular implementation. Further, in some embodiments, the application servers 110 may include a database connector 118 for each connection pool, a database connector 118 for more than one connection pool, or a database connector 118 for all the connection pools, depending on the particular implementation. In FIG. 1, the application server 110a is depicted as including a request shedder 114a, a wait queue 116a, and a database connector 118a; and the application server 110b is depicted as including a request shedder 114b, a wait queue 116b, and a database connector 118b as non-limiting examples.

The wait queues 116 may be configured to receive connection requests for queries when the connection pool is depleted. As indicated above, the connection requests may be generated when the corresponding application server 110 receives an application request from the load balancer 112. The wait queues 116 may include any suitable software, hardware, firmware, or any combination thereof, configured to perform queueing of connection requests. In some embodiments, the wait queues 116 may be implemented within data access layers (DALs) of their respective application servers 110.

The request shedders 114 may be configured to perform predictive connection request shedding with respect to connection requests that may be associated with application requests communicated by the client devices 102. The request shedders 114 may be configured to monitor the connection pool to determine whether to shed connection requests according to the predictive connection request shedding. In some embodiments, the request shedders 114 may be configured to perform one or more operations of a method 300 described below with respect to FIG. 3 to perform the predictive connection request shedding. The request shedders 114 may include any suitable software, hardware, firmware, or any combination thereof, configured to perform one or more operations associated with predictive connection request shedding. In some embodiments, the request shedders 114 may be implemented within the DALs of their respective application servers 110.

The database connectors 118 may be configured to establish connections between their respective application servers 110 and the database 108. The database connectors 118 may be configured to place the established connections in the connection pool. As described in further detail below, in some embodiments, the database connectors 118 may be configured to establish one or more additional connections with the database 118 for the connection pool in response to the connection pool being depleted but not maximized. The database connectors 118 may include any suitable software, hardware, firmware, or any combination thereof, configured to establish connections with the database 108. In some embodiments, the database connectors 118 may be implemented within the DALs of their respective application servers 110.

The database 108 may include one or more one or more storage devices that may be configured to store information. The storage devices may include any suitable computer-readable media configured to retain program instructions and/or data for a period of time. By way of example, and not limitation, such computer-readable media may include tangible and/or non-transitory computer-readable storage media, including Random Access Memory (RAM), Read-Only Memory (ROM), Electrically Erasable Programmable Read-Only Memory (EEPROM), Compact Disk Read-Only Memory (CD-ROM) or other optical disk storage, magnetic disk storage or other magnetic storage devices, flash memory devices (e.g., solid state memory devices), a specific molecular sequence (e.g., DNA or RNA), or any other applicable storage medium.

Figure 2:
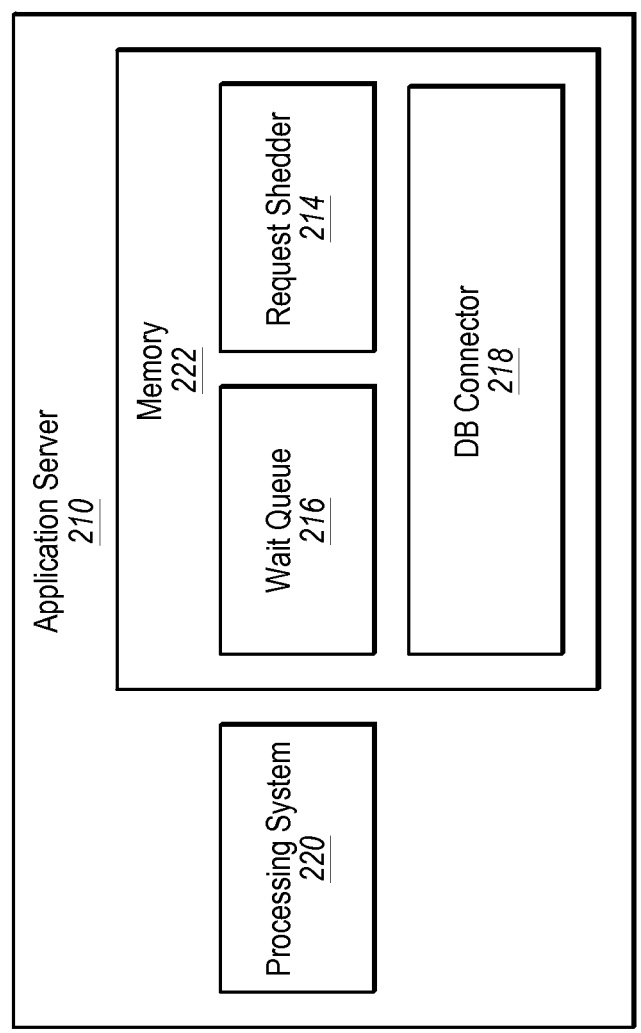
FIG. 2 illustrates an exemplary application server.

FIG. 2 illustrates an exemplary application server 210 that may be an example of one or more of the application servers 110 of FIG. 1, according to at least one embodiment described herein. The application server 210 may include any suitable system, apparatus, or device configured to receive application requests and generate corresponding connection requests and queries in response to the application requests.

The processing system 220 may include one or more of any suitable special-purpose or general-purpose computer, computing entity, or processing device including various computer hardware or software modules and may be configured to execute instructions stored on any applicable computer-readable storage media. For example, the processing system 220 may include a microprocessor, a microcontroller, a digital signal processor (DSP), an application-specific integrated circuit (ASIC), a Field-Programmable Gate Array (FPGA), any other digital or analog circuitry configured to interpret and/or to execute program instructions and/or to process data, or any combination thereof.

The memory 222 may include computer-readable storage media for carrying or having computer-executable instructions or data structures stored thereon. Such computer-readable storage media may include any available media that may be accessed by a general-purpose or special-purpose computer, such as the processing system 220. For example, as listed above with respect to the storage devices, the memory 222 may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data for the processing system 220 to cause the application server 210 to perform a certain function or group of functions.

The application server 210 may also include a connection wait queue 216 ("wait queue 216"), a request shedder 214, and a database connector ("DB connector") 218. The wait queue 216, the request shedder 214, and the database connector 218 may be examples of the wait queues 116, the request shedders 114, and the database connectors 118, respectively, of FIG. 1. In some embodiments, the wait queue 216, the request shedder 214, and the database connector 218 may be included in the memory 222 as logic or instructions for execution by the processing system 220. Additionally or alternatively, the wait queue 216, the request shedder 214, and the database connector 218 may include instructions for execution by the processing system 220 to cause the application server 210 to perform operations associated with those described with respect to the wait queue 216 and/or the request shedder 214.

Modifications, additions, or omissions may be made to the application server 210 without departing from the scope of the present disclosure. For example, in some embodiments, the application server 210 may include any number of wait queues 216 or request shedders 214 depending on the particular implementation.

Figure 3:
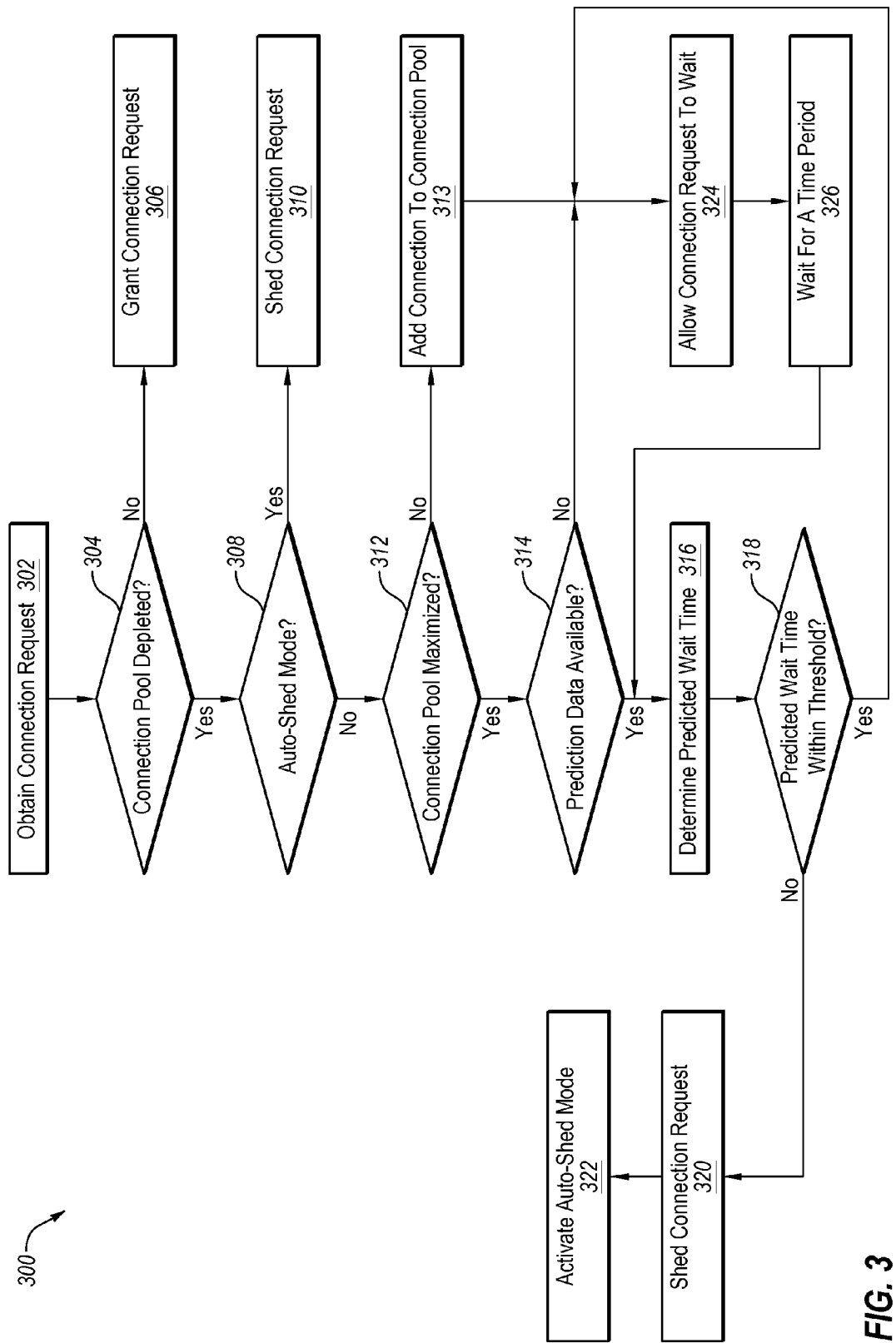
FIG. 3 illustrates a flowchart of an exemplary method for predictive connection request shedding.

FIG. 3 is a flowchart of an exemplary method 300 of performing predictive connection request shedding, according to at least one embodiment described herein. One or more operations of the method 300 may be implemented, in some embodiments, by an application server such as the application servers 110 or the application server 210 of FIGS. 1 and 2, respectively. Although illustrated as discrete blocks, various blocks of the method 300 may be divided into additional blocks, combined into fewer blocks, or eliminated, depending, for example, on implementation.

The method 300 may begin and at block 302 a connection request may be obtained. In some embodiments, the connection request may be obtained by being generated by a requester of the application server in response to receiving an application request to access a database to which the application server may have access. Additionally or alternatively, the connection request may be obtained from a connection wait queue ("wait queue") of the application server. In the present disclosure, reference to obtaining a connection request from the wait queue may include analyzing the connection request while it is in the wait queue such that the connection request may be maintained in and not removed from the wait queue. The connection request may be associated with a query that may perform operations with respect to the database as indicated in the application request. Further, as indicated above, the connection request may include a request to use a connection, between the application server and the database, of a connection pool associated with the application to process the query.

At block 304, it may be determined whether the connection pool is depleted. When the connection pool is not depleted, the method 300 may proceed to block 306. When the connection pool is depleted, the method 300 may proceed to block 308.

As indicated above, when the connection pool is not depleted, an available connection of the connection pool may be used to process the query associated with the connection request. As such, at block 306, the connection request may be granted such that the associated query may be processed. In some embodiments, the connection request may be granted by returning the available connection to the requester that generated the connection request such that the connection request may be granted.

At block 308, it may be determined whether an auto-shed mode is activated. In some embodiments, when a connection request is shed, an automatic or auto-shed mode may be activated for a particular amount of time after the connection request is shed. The automatic shedding may thus free up the wait queue and reduce a potential see-saw effect where subsequent connection requests may be shed or not shed when a wait time associated with the wait queue (explained below) is on the verge of a target or threshold wait time. In some embodiments, during the auto-shed mode, all connection requests may be shed. After the particular amount of time has passed from when the auto-shed mode was activated, the auto-shed mode may be deactivated. Accordingly, at block 308, it may be determined whether the auto-shed mode is activated.

In response to the auto-shed mode being activated, the method 300 may proceed from block 308 to block 310 where the connection request may be shed. As indicated above, shedding of a connection request may include deleting the connection request before the connection request times out such that its corresponding query may not be processed. By way of example, a connection request in the wait queue may be shed by being removed from the wait queue before the connection request times out or before a connection is available for processing its associated query. Additionally or alternatively, a connection request may be shed by not being entered into the wait queue at all. As indicated above, reference to the shedding of the connection request may also refer to the corresponding query being shed. In response to the auto-shed mode not being activated, the method 300 may proceed from block 308 to block 312.

At block 312, it may be determined whether the connection pool is maximized. In response to the connection pool being maximized, the method 300 may proceed to block 314. In response to the connection pool not being maximized, the method 300 may proceed to block 313.

A determination at block 312 that the connection pool is not maximized may indicate that the connection pool may be depleted (e.g., as indicated by the "Yes" decision with respect to block 304) such that more connections may be added to the connection pool. Therefore, at block 313, a connection may be added to the connection pool. Following block 313, the method 300 may proceed to block 324 where the connection request may be allowed to wait (e.g., added to the wait queue), as described further below.

As indicated above, a determination that the connection pool is maximized at block 312 may indicate that the connection pool may also be depleted (e.g., as indicated by the "Yes" decision with respect to block 304) and the method 300 may proceed to block 314. At block 314, it may be determined whether at least a target amount of prediction data is available. Prediction data may include data that may be used to predict a wait time for a connection request once it has entered the wait queue. For example, the prediction data may include an average amount of time to process a connection request ("request time"), a number of connection requests in the wait queue, a total number connections in the connection pool, a latency of the network between the database and the client devices making the corresponding application requests (e.g., latency of the network 104 of FIG. 1), and stability of the database. In some instances a sufficient amount of prediction data may not be available to predict a wait time within a target degree of certainty. For example, in some instances, the wait queue may have recently began to be filled such that the average request time associated with the wait queue may not represent an actual average request time in the near future because the sample size in determining the average request time may not be sufficiently large. Therefore, the target amount of prediction data may be based on a statistical analysis for one or more of the different elements that may be included in the prediction data.

At block 314, in response to at least the target amount of prediction data being determined to be available, the method 300 may proceed to block 316. In response to a determination that less than the target amount of prediction data is available, the method 300 may proceed to block 324.

At block 316, a predicted wait time may be determined for the connection request. The predicted wait time may predict an amount of time until a connection may be available to process the query corresponding to the connection request. In some embodiments, the predicted wait time may be determined based on one or more factors that may be included in the prediction data. For example, in some embodiments, the request time ("R") for the connection request may be multiplied by the number of connection requests included in the wait queue ("C") that may be in front of the connection request, and then divided by the number of connections in the connection pool ("N") to determine the predicted wait time ("W"), which may be represented by the following function: "W=C*R/N." Additionally or alternatively, factors such as a network latency multiplier "L" and/or a database stability multiplier ("D") may be applied to the expression to generate the following function: "W=C*R*L*D/N."

As described in further detail below, in some embodiments, the connection request may have been previously entered into the wait queue and then after a designated amount of time, its predicted wait time may be determined again at block 316. In these or other embodiments, the amount of time that the connection request has already been waiting may be added to the predicted wait time such the predicted wait time may represent a predicted total wait time for the connection request.

At block 318, it may be determined whether the predicted wait time is within a threshold amount of time. In some embodiments, the threshold amount of time may be related to a timeout time of the connection request. For example, the timeout time of the connection request may be 1000 milliseconds (ms) in some instances such that the threshold may be 1000 ms. It will be appreciated that the timeout time of the connection request may also be smaller, such as 750 ms, 500 ms or smaller, and the timeout time of the connection request may also be larger such as 1200 ms, 1500 ms or more. Additionally or alternatively, in some embodiments, the threshold amount of time may be larger or smaller than the timeout time. For example, in some embodiments, a percentage (e.g., 5%, 10%, etc.) of the timeout time may be applied to the timeout time to determine the threshold time. For instance, the threshold time may be 110% of the timeout time in some embodiments.

In response to a determination that the predicted wait time is not within the threshold time at block 318, the method 300 may proceed to block 320. In response to a determination that the predicted wait time is within the threshold time at block 318, the method 300 may proceed to block 324.

At block 320, the connection request may be shed and the method 300 may proceed to block 322. At block 322, the auto-shed mode, which is described above, may be activated. As indicated above, in some embodiments, the auto-shed mode may be activated for a particular amount of time and then may be deactivated.

At block 324, the connection request may be allowed to wait. For example, in some instances the connection request may be obtained before being entered into the wait queue. Therefore, in some instances, the connection request may be allowed to wait by being entered into the wait queue at block 324. As another example, the connection request may be obtained from the wait queue itself and may be allowed to maintain its position in the wait queue at block 324.

At block 326, a wait may be performed for a particular time period. In some instances, one or more factors associated with the wait time for the connection request may change after the connection request has been entered into the wait queue. Therefore, the predicted wait time may be less accurate than it was when it was previously determined. Therefore, following block 326, the method 300 may return to block 316 to determine the predicted wait time again to account for potential changes in the factors. The particular time period that corresponds to block 326 may include a subset of the timeout time for the connection request. For example, when the timeout time is 1000 ms, the particular time period may be 100 ms. In some embodiments, blocks 316, 318, 324, and 326 may be repeated until a connection is available for the connection request, until the predicted time is not within the threshold, or the connection request times out.

The method 300 may accordingly be used to perform predictive connection request shedding. The shedding may help an associated database management system run more efficiently than were it not to be used.

One skilled in the art will appreciate that, for the method 300, the operations performed may be implemented in differing order than described. Furthermore, the outlined operations and actions are only provided as examples, and some of the operations and actions may be optional, combined into fewer steps and actions, or expanded into additional steps and actions without detracting from the essence of the disclosed embodiments. For example, in some embodiments the auto-shed mode may not be implemented such that operations associated with blocks 308, 310, and 322 may be omitted. Additionally or alternatively, in some embodiments, the operations associated with blocks 312 and 313 may be omitted. In these or other embodiments, the operations associated with block 314 may be omitted.

Additionally, although the method 300 is described in a psuedo-sequential manner with respect to connection requests, one or more operations of the method 300 may be performed at any one time with respect to more than one connection request. Moreover, one or more of the operations of the method 300 may be performed simultaneously.

As indicated above, the embodiments described herein may include the use of a special purpose or general purpose computer including various computer hardware or software modules, as discussed in greater detail below. Further, as indicated above, embodiments described herein may be implemented using computer-readable media for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of a computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
obtaining a connection request to utilize a connection to communicate with a database, the communication being with respect to an operation to be performed with respect to data stored on the database, the operation related to a query;
determining a predicted wait time for the connection request in which the predicted wait time is a predicted amount of time until the connection with the database will be available to be able to begin performance of the operation with respect to the data stored on the database; and determining whether to shed the connection request before the connection to the database has been established and before a connection request timeout time based on whether the predicted wait time exceeds the connection request timeout time.

2. The method of claim 1, further comprising shedding the connection request before the connection request timeout time in response to the predicted wait time exceeding the connection request timeout time.

3. The method of claim 2, further comprising activating, in response to shedding the connection request, an auto-shed mode in which subsequent connection requests are automatically shed.

4. The method of claim 3, further comprising deactivating the auto-shed mode after a predetermined amount of time.

5. The method of claim 1, further comprising determining whether to shed the connection request based on whether the predicted wait time is greater than a threshold wait time associated with the connection request timeout time.

6. The method of claim 5, wherein the threshold wait time is approximately equal to the connection request timeout time.

7. The method of claim 5, wherein the threshold wait time is greater than the connection request timeout time.

8. The method of claim 1, further comprising determining whether to shed the connection request based on a determination as to whether a connection pool associated with the database is depleted.

9. The method of claim 1, further comprising determining whether to shed the connection request based on a determination as to whether a connection pool associated with the database is maximized.

10. The method of claim 1, further comprising determining whether to shed the connection request based on whether a threshold amount of prediction data for determining the predicted wait time is available.

11. The method of claim 1, further comprising allowing the connection request to wait in a wait queue in response to the predicted wait time not exceeding the connection request timeout time.

12. The method of claim 11, further comprising determining the predicted wait time again after the connection request has waited in the wait queue for a predetermined amount of time.

13. Non-transitory computer-readable storage media configured to store instructions that, in response to being executed by one or more processors, cause a system to perform operations, the operations comprising:

obtaining a connection request to utilize a connection to communicate with a, the communication being with respect to an operation to be performed with respect to data stored on the database, the operation related to a query;

determining a predicted wait time for the connection request in which the predicted wait time is a predicted amount of time until the connection with the database will be available to be able to begin performance of the operation with respect to the data stored on the database; and shedding the connection request before the connection to the database has been established and before a connection request timeout time in response to the predicted wait time exceeding the connection request timeout time.

14. The non-transitory computer-readable storage media of claim 13, wherein the operations further comprise activating, in response to shedding the connection request, an auto-shed mode in which subsequent connection requests are automatically shed.

15. The non-transitory computer-readable storage media of claim 14, wherein the operations further comprise deactivating the auto-shed mode after a predetermined amount of time.

16. The non-transitory computer-readable storage media of claim 13, wherein the operations further comprise shedding the connection request based on the predicted wait time being greater than a threshold wait time associated with the connection request timeout time.

17. The non-transitory computer-readable storage media of claim 13, wherein the operations further comprise shedding the connection request based on a determination that a connection pool associated with the database is depleted.

18. The non-transitory computer-readable storage media of claim 13, wherein the operations further comprise shedding the connection request based on a determination that a connection pool associated with the database is maximized.

19. The non-transitory computer-readable storage media of claim 13, wherein the operations further comprise shedding the connection request based on a threshold amount of prediction data for determining the predicted wait time being available.

20. A system comprising:
a processing system; and
a memory configured to store instructions that, in response to being executed by the processing system, cause the system to perform operations, the operations comprising:

obtaining a connection request to utilize a connection to communicate with a database, the communication being with respect to an operation to be performed with respect to data stored on the database, the operation related to a query;

determining a predicted wait time for the connection request in which the predicted wait time is a predicted amount of time until the connection with the database will be available to be able to begin performance of the operation with respect to the data stored on the database; and determining whether to place the connection request in a wait queue for connecting to the database based on whether the predicted wait time exceeds a connection request timeout time.

\* \* \* \* \*